United States Patent
Iyasu et al.

(10) Patent No.: US 10,897,208 B2
(45) Date of Patent: Jan. 19, 2021

(54) FULL BRIDGE CONFIGURATION POWER CONVERSION APPARATUS FOR POWER CONVERSION AMONG AT LEAST THREE DEVICES

(71) Applicants: DENSO CORPORATION, Kariya (JP); IBARAKI UNIVERSITY, Mito (JP)

(72) Inventors: Seiji Iyasu, Nisshin (JP); Yuji Hayashi, Nisshin (JP); Masatoshi Uno, Mito (JP)

(73) Assignees: DENSO CORPORATION, Kariya (JP); IBARAKI UNIVERSITY, Ibaraki (JP)

( * ) Notice: Subject to any disclaimer, the term of this patent is extended or adjusted under 35 U.S.C. 154(b) by 0 days.

(21) Appl. No.: 16/677,988

(22) Filed: Nov. 8, 2019

(65) Prior Publication Data

US 2020/0161981 A1   May 21, 2020

(30) Foreign Application Priority Data

Nov. 15, 2018   (JP) .................................. 2018-215094

(51) Int. Cl.
*H02M 3/335*   (2006.01)
*H02M 3/337*   (2006.01)

(52) U.S. Cl.
CPC ..... *H02M 3/33546* (2013.01); *H02M 3/3376* (2013.01); *H02M 3/33576* (2013.01)

(58) Field of Classification Search
CPC ......... H02M 3/33546; H02M 3/33553; H02M 3/33569; H02M 3/33576; H02M 3/33584
See application file for complete search history.

(56) References Cited

U.S. PATENT DOCUMENTS

| 2011/0198933 | A1* | 8/2011 | Ishigaki | B60R 25/00 307/66 |
| 2014/0132066 | A1* | 5/2014 | Hirano | H02M 3/33561 307/17 |
| 2014/0133187 | A1* | 5/2014 | Hirano | H02M 3/33584 363/17 |
| 2014/0233265 | A1* | 8/2014 | Hirano | H02M 3/33576 363/17 |
| 2015/0138840 | A1 | 5/2015 | Muto | |
| 2015/0229217 | A1* | 8/2015 | Hirano | H02M 1/32 363/17 |
| 2015/0295501 | A1* | 10/2015 | Hirano | H02M 3/3353 363/17 |

(Continued)

FOREIGN PATENT DOCUMENTS

JP   2015-198460 A   11/2015

*Primary Examiner* — Thienvu V Tran
*Assistant Examiner* — Sisay G Tiku
(74) *Attorney, Agent, or Firm* — Oliff PLC

(57) ABSTRACT

A power conversion apparatus performs power conversion among at least a first device, a second device, and a third device. The power conversion apparatus includes a primary converter configured to perform power conversion between the first device and second device. The primary converter includes a first switch, a second switch, a third switch, a fourth switch, and a capacitor. The second switch, the third switch, the fourth switch, and the capacitor are connected in full bridge configuration to constitute a full bridge converter.

8 Claims, 10 Drawing Sheets

(56) References Cited

U.S. PATENT DOCUMENTS

| | | | | |
|---|---|---|---|---|
| 2015/0295502 A1* | 10/2015 | Hirano | .................... | H02M 1/36 |
| | | | | 363/17 |
| 2015/0295503 A1* | 10/2015 | Muto | ................ | H02M 3/33561 |
| | | | | 363/17 |
| 2016/0190944 A1* | 6/2016 | Uchihara | .......... | H02M 3/33546 |
| | | | | 363/17 |

* cited by examiner

< Duty>0.5 >

FULL BRIDGE CONFIGURATION POWER CONVERSION APPARATUS FOR POWER CONVERSION AMONG AT LEAST THREE DEVICES

CROSS-REFERENCE TO RELATED APPLICATION

This application is based on and claims the benefit of priority from earlier Japanese Patent Application No. 2018-215094 filed on Nov. 15, 2018, the entire disclosure of which is incorporated herein by reference.

TECHNICAL FIELD

The present disclosure relates to power conversion apparatuses capable of transmitting power among a first device, a second device, and a third device.

BACKGROUND

A known power conversion apparatus provided with a transformer, an example of which has first to fourth input/output (I/O) ports, and is configured to transmit power among the first to fourth I/O ports.

SUMMARY

According to an aspect of the present disclosure, there is provided a power conversion apparatus for power conversion among at least a first device, a second device, and a third device.

The power converter includes a primary converter configured to perform power conversion between the first device and second device. The primary converter includes a first switch, a second switch, a third switch, a fourth switch, and a capacitor. The second switch, the third switch, the fourth switch, and the capacitor are connected in full bridge configuration to constitute a full bridge converter.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

View Point

Figure 1:
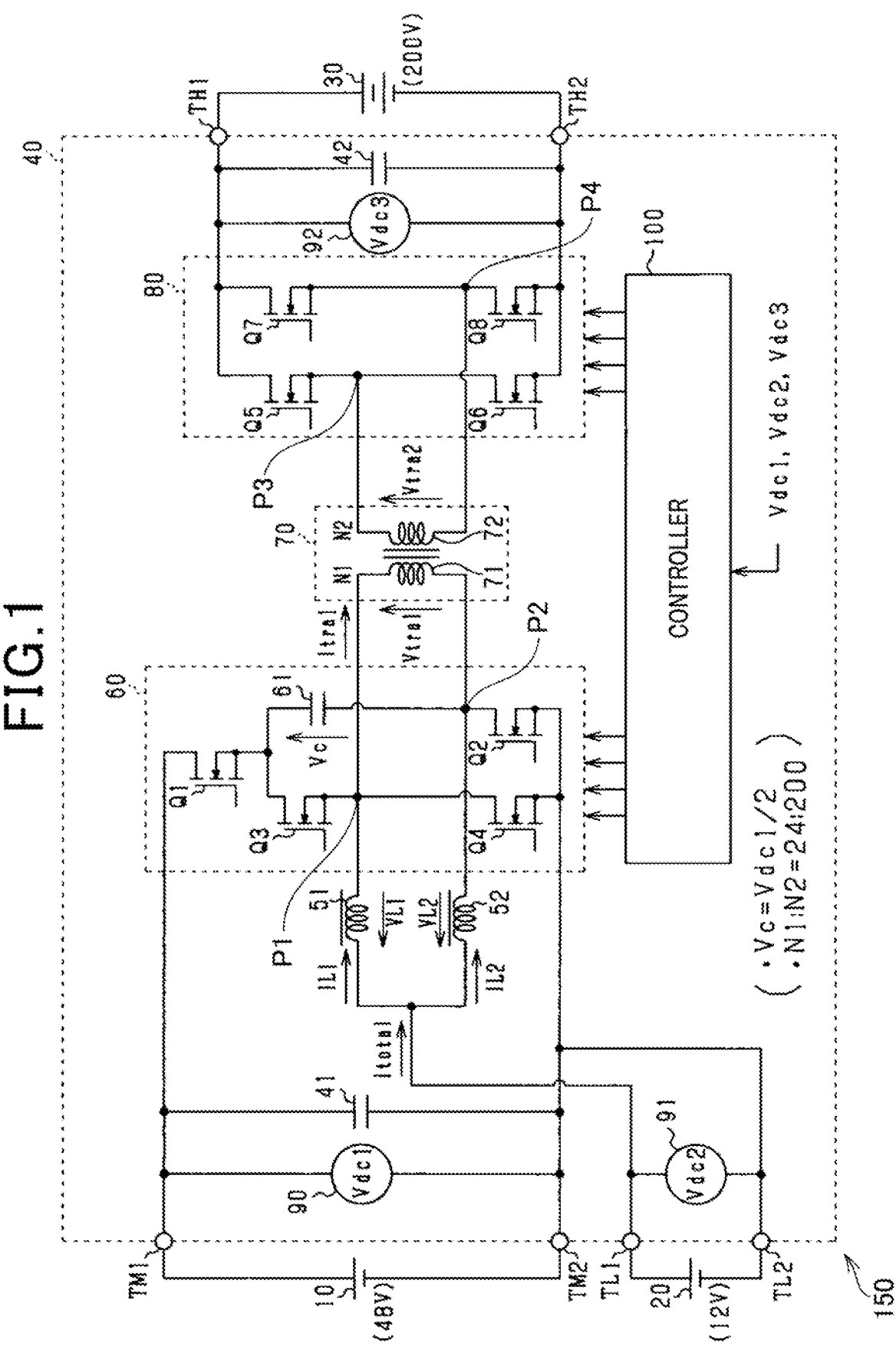
FIG. 1 is a circuit diagram schematically illustrating an example of the overall configuration of a power conversion apparatus according to the first embodiment of the present disclosure.

A known power conversion apparatus provided with a transformer, an example of which is disclosed in Japanese Patent Application Publication No. 2015-100198, which will also be referred to as a published patent document, has first to fourth input/output (I/O) ports, and is configured to transmit power among the first to fourth I/O ports.

A first device, which serves as a primary high-voltage load, is connected to the first I/O ports, and a second device, which serves as a primary low-voltage load, is connected to the second I/O ports. For example, a secondary battery can be used as the second device. Each of the first and second devices has a terminal voltage thereacross, and the terminal voltage, such as 12 volts (V), across the second device is lower than the terminal voltage, such as 48 V, across the first device. A third device, which serves as a secondary high-voltage load, is connected to the third I/O ports, and a fourth device, which serves as a secondary low-voltage load, is connected to the fourth I/O ports. For example, a secondary battery can be used as the third device. Each of the third and fourth devices has a terminal voltage thereacross, and the terminal voltage, such as 288 V, across the third device is higher than the terminal voltage, such as 72 V, across the fourth device. The terminal voltage across the fourth device is higher than the terminal voltage across the first device.

The power conversion apparatus includes a primary converter, the transformer, and a secondary converter.

The transformer includes a primary coil and a secondary coil. The primary coil is connected to the first and second I/O ports via the primary converter, and the secondary coil of the transformer is connected to the third and fourth I/O ports via the secondary converter.

Each of the primary and secondary converters is comprised of switches.

Adjusting a duty factor of each switch of the primary converter enables power transmitted between the first and second devices to be adjusted. Note that the duty factor of each switch represents a controllable ratio, i.e. percentage, of an on-duration of the switch and a corresponding switching cycle of the switch.

Additionally, adjusting the phase difference between a switching phase of each switch of the secondary converter and a switching phase of the corresponding switch of the primary converter also enables power transmitted between the first and third devices to be adjusted.

As described above, the primary converter of the published patent document converts the terminal voltage across the first device into the terminal voltage across the second device, which is lower than the terminal voltage across the first device.

This results in an increase in the difference between the terminal voltage across the first device, which is referred to as VA, and the terminal voltage across the second device, which is referred to as VB, reducing the duty factor, which is referred to as D, of each switch of the primary converter upon power transmission between the first and second devices.

This is because the terminal voltage VB across the second device can be calculated by the product of the duty factor D and the terminal voltage VA across the first device, which can be expressed by "VB=D×VA (VB<VA)", so that an increase in the difference between the terminal voltage VA and the terminal voltage VB requires a decrease in the duty factor D.

Power transmission between the first and third devices while the duty factor for each switch of the primary converter is set to a lower value may reduce the utilization factor of the transformer. Note that the utilization factor of the transformer represents the percentage of a period in which a non-zero voltage is applied across the primary coil during a predetermined reference period, such as each switching cycle for the primary converter.

A reduction in the utilization factor of the transformer may result in reduced power conversion efficiency between the first and third devices.

From this viewpoint, the present disclosure seeks to provide power conversion apparatuses equipped with a transformer, each of which is capable of having higher conversion efficiency.

According to a first exemplary aspect of the present disclosure, there is provided a power conversion apparatus for power conversion among at least a first device, a second device, and a third device. A first terminal voltage across the first device is set to be higher than a second terminal voltage across the second device and lower than a third terminal voltage across the third device. The power converter includes a primary converter configured to perform power conversion between the first device and second device, the primary converter comprising a first switch, a second switch, a third switch, a fourth switch, and a capacitor. The second switch, the third switch, the fourth switch, and the capacitor are connected in full bridge configuration to constitute a full bridge converter having a first connection point between the third and fourth switches and a second connection point between the capacitor and the second switch. The first switch is connected in series between the full bridge converter and the first device.

The power conversion apparatus includes a secondary converter including at least one conversion switch connected to the third device, and a magnetic circuit configured to magnetically connect between the primary converter and the secondary converter while electrically isolating between the primary converter and the secondary converter. The secondary converter is configured to perform power conversion of power transmitted between the transformer and the third device.

The power conversion apparatus includes a first inductor connected between the first connection point of the full bridge converter and the second device, and a second inductor connected between the second connection point of the full bridge converter and the second device.

The power conversion apparatus includes a controller configured to control on-off switching operations of the at least one conversion switch, alternately turn on the first and second switches, and alternately turn on the third and fourth switches.

This configuration of the power conversion apparatus enables the voltage boost ratio of the power conversion apparatus upon power being transmitted from the first device to the second device to have a higher value even if there is a large difference between the first terminal voltage across the first device and the second terminal voltage across the second device. This therefore enables the duty factor for each of the first to fourth switches to be set to a higher value. Setting the duty factor for each of the first to fourth switches to a higher value increases the utilization factor of the magnetic circuit, thus increasing the power conversion efficiency during power transmission between the first device and the third device.

EMBODIMENT

The following describes embodiments of the present disclosure with reference to the accompanying drawings. In the embodiments, similar or equivalent parts between the embodiments, to which like reference characters are assigned, are omitted or simplified to avoid redundant description.

First Embodiment

The following describes a power conversion system 150, which includes a power conversion apparatus 40 according to the first embodiment, with reference to FIGS. 1 to 7. The power conversion apparatus 40 of the first embodiment is designed as a direct-current (DC) to DC multiport converter, and the power conversion apparatus 40 is installed in a vehicle.

The power conversion system 150 includes a medium-voltage storage battery 10 serving as, for example, a first device, a low-voltage storage battery 20 serving as, for example, a second device, a high-voltage storage battery 30 serving as, for example, a third device, and the power conversion apparatus 40.

Each of the medium-voltage storage battery 10, low-voltage storage battery 20, and high-voltage storage battery 30 has a terminal voltage thereacross. The terminal voltage across the low-voltage storage battery 20 is set to be lower than the terminal voltage across the medium-voltage storage battery 10, and the terminal voltage across the medium-voltage storage battery 10 is set to be lower than the terminal voltage across the high-voltage storage battery 30. For example, the low-voltage storage battery 20 has a rated voltage of 12 V as a value of the terminal voltage thereacross, the medium-voltage storage battery 10 has a rated voltage of 48 V as a value of the terminal voltage, and the high-voltage storage battery 30 has a rated voltage of 200 V as a value of the terminal voltage thereacross.

The power conversion apparatus 40 includes first and second medium-voltage terminals (I/O ports) TM1 and TM2, first and second low-voltage terminals (I/O ports) TL1 and TL2, and first and second high-voltage terminals (I/O ports) TH1 and TH2.

The power conversion apparatus 40 also includes a first capacitor 41, a second capacitor 42, a first inductor, i.e. reactor, 51, a second inductor 52, a first converter 60, a transformer 70, a second converter 80, and a controller 100.

The first converter 60 includes first to fourth switches Q1 to Q4 and a decoupling capacitor 61.

For example, the first embodiment uses N-channel MOSFETS as the respective first to fourth switches Q1 to Q4.

Each of the first to fourth switches Q1 to Q4 has the drain as a first terminal, the source as a second terminal, and the gate as a control terminal. Each of the first and second inductors 51 and 52 has opposing first and second ends, and each of the first and second capacitors 41 and 42 has opposing first and second ends, i.e. opposing first and second electrodes. Each of the batteries 10, 20, and 30 has opposing positive and negative terminals.

The first medium-voltage terminal TM1 is connected to the drain of the first switch Q1, and the source of the first switch Q1 is connected to both the first end of the decoupling capacitor 61 and the drain of the third switch Q3.

The source of the third switch Q3 is connected to the drain of the fourth switch Q4 at a connection point P1, and the source of the fourth switch Q4 is connected to the second medium-voltage terminal TM2. The second end of the decoupling capacitor 61 is connected to the drain of the second switch Q2 at a connection point P2, and the source of the second switch Q2 is connected to the second medium-voltage terminal TM2. The first medium-voltage terminal TM1 is connected to the first end of the first capacitor 41, and the second medium-voltage terminal TM2 is connected to the second end of the first capacitor 41.

The positive terminal of the medium-voltage storage battery 10 is connected to the first medium-voltage terminal TM1, and the negative terminal of the medium-voltage storage battery 10 is connected to the second medium-voltage terminal TM2. This results in the first capacitor 41 and the medium-voltage storage battery 10 being connected in parallel to each other.

The first end of the first inductor 51 is connected to the connection point P2 between the source of the third switch Q3 and the drain of the fourth switch Q4. The first end of the second inductor 52 is connected to the connection point P2 between the second end of the decoupling capacitor 61 and the drain of the second switch Q2.

That is, the first converter 60 is configured such that the second switch Q2, the third switch Q3, the fourth switch Q4, and the decoupling capacitor 61 are connected in full bridge configuration to constitute a full bridge converter, and the first switch Q1 is connected in series between the full bridge converter and the first medium-voltage terminal TM1.

The first low-voltage terminal TL1 is connected to both the second ends of the respective first and second inductors 51 and 52. The positive terminal of the low-voltage storage battery 20 is connected to the first low-voltage terminal TL1, and the negative terminal of the low-voltage storage battery 20 is connected to the second low-voltage terminal TL2.

The source of each of the second and fourth switches Q2 and Q4 is connected to both the second medium-voltage terminal TM2 and the second low-voltage terminal TL2. The line connected to the negative terminal of the medium-voltage storage battery 10 via the terminal TM2, the negative terminal of the low-voltage storage battery 20 via the terminal TL2, and the source of each of the second and fourth switches Q2 and Q4 serves as a first common signal ground of the power conversion apparatus 40. A single common terminal can be provided to the power conversion apparatus 40 to be shared as the second medium-voltage terminal TM2 and the second low-voltage terminal TL2.

The transformer 70, which serves as, for example, a magnetic circuit, is comprised of a primary coil 71 and a secondary coil 72 that are magnetically coupled to each other while electrically isolated from each other. Each of the primary and secondary coils 71 and 72 has opposing first and second ends.

The first end of the primary coil 71 is connected to the connection point P1 between the source of the third switch Q3 and the drain of the fourth switch Q4. The second end of the primary coil 71 is connected to the connection point P2 between the second end of the decoupling capacitor 61 and the drain of the second switch Q2.

The transformer 70 is configured to transform a primary voltage Vtra1 across the primary coil 71 into a secondary voltage Vtra2 across the secondary coil 72.

The second converter 80 is configured as a full-bridge converter comprised of fifth to eighth switches Q5 to Q8 connected in full-bridge configuration; each of the fifth to eighth switches Q5 to Q8 serves as a conversion switch. For example, the first embodiment uses N-channel MOSFETS as the respective fifth to eighth switches Q5 to Q8.

The first high-voltage terminal TH1 is connected to the drain of each of the fifth and seventh switches Q5 and Q7. The source of the fifth switch Q5 is connected to the drain of the sixth switch Q6 at a connection point P3, and the source of the seventh switch Q7 is connected to the drain of the eighth switch Q8 at a connection point P4.

The source of each of the sixth and eighth switches Q6 and Q8 is connected to the second high-voltage terminal TH2. The first high-voltage terminal TH1 is connected to the first end of the second capacitor 42, and the second high-voltage terminal TH2 is connected to the second end of the second capacitor 42.

The positive terminal of the high-voltage storage battery 30 is connected to the first high-voltage terminal TH1, and the negative terminal of the high-voltage storage battery 30 is connected to the second high-voltage terminal TH2. This results in the second capacitor 42 and the high-voltage storage battery 30 being connected in parallel to each other.

The source of each of the sixth and eighth switches Q6 and Q8 is connected to the second high-voltage terminal TH2. The line connected to the negative terminal of the high-voltage storage battery 30 via the terminal TH2, and the source of each of the sixth and eighth switches Q6 and Q8 serves as a second common signal ground of the power conversion apparatus 40. The second common signal ground is for example electrically isolated from the first common signal ground.

The first end of the secondary coil 72 is connected to the connection point P3 between the source of the fifth switch Q5 and the drain of the sixth switch Q6. The second end of the secondary coil 72 is connected to the connection point P4 between the source of the seventh switch Q7 and the drain of the eighth switch Q8.

The primary coil 71 has the number of turns N1, and the secondary coil 72 has the number of turns N2. Let us assume that the rated voltage of the medium-voltage storage battery 10 will be referred to as V1, and the rated voltage of the high-voltage storage battery 30 will be referred to as V2. In this assumption, the number of turns N1 and the number of turns N2 are determined to satisfy the following equation:

$$N1:N2 = 0.5 \times V1:V3$$
$$= 12\,(V):200\,(V)$$

This relationship between the number of turns N1 and the number of turns N2 aims to increase power-conversion efficiency by the power conversion apparatus 40 between the medium-voltage storage battery 10 and the high-voltage storage battery 30.

The power conversion apparatus 40 also includes a medium-voltage sensor 90, a low-voltage sensor 91, and a high-voltage sensor 92.

The medium-voltage sensor 90 is connected across the medium-voltage storage battery 10, and configured to measure the terminal voltage across the medium-voltage storage battery 10 as a first voltage Vdc1; the terminal voltage across the medium-voltage storage battery 10 represents a potential difference between the first medium-voltage terminal TM1 and the second medium-voltage terminal TM2.

The low-voltage sensor 91 is connected across the low-voltage storage battery 20, and configured to measure the terminal voltage across the low-voltage storage battery 20 as a second voltage Vdc2; the terminal voltage across the low-voltage storage battery 20 represents a potential difference between the first low-voltage terminal TL1 and the second low-voltage terminal TL2.

The high-voltage sensor 92 is connected across the high-voltage storage battery 30, and configured to measure the terminal voltage across the high-voltage storage battery 30 as a third voltage Vdc3; the terminal voltage across the high-voltage storage battery 30 represents a potential difference between the first high-voltage terminal TH1 and the second high-voltage terminal TH2.

The measurement values, i.e. the first to third voltages, Vdc1 to Vdc3 respectively measured by the sensors 90 to 92 are input to the controller 100 of the power conversion apparatus 40.

The controller 100 receives the measurement values, i.e. the first to third voltages, Vdc1 to Vdc3, and controls on-off switching operations of each of the first to eighth switches Q1 to Q8 in accordance with the measurement values Vdc1 to Vdc3 while setting a switching cycle Ts of each of the first to eighth switches Q1 to Q8 to a constant value.

The controller 100 includes various functions including the above on-off switching control function. At least part of all functions provided by the controller 100 can be implemented by at least one processor; the at least one processor can be comprised of (1) A combination of at least one programmed processing unit, i.e. at least one programmed logic circuit, and at least one memory including software that causes the at least one programmed logic circuit to implement all the functions
(2) At least one hardwired logic circuit that implements all the functions
(3) At least one hardwired-logic and programmed-logic hybrid circuit that implements all the functions The controller 100 is configured to control on-off switching operations of each of the first to fourth switches Q1 to Q4 to thereby transmit power between the medium-voltage storage battery 10 and the low-voltage storage battery 20.

Specifically, the controller 100 is configured to (1) Alternately, i.e. complementarily, turn on the first and second switches Q1 and Q2 while synchronizing an on duration of one of the first and second switches Q1 and Q2 with an off duration of the other thereof in the respective switching cycles Ts (2) Alternately turn on the third and fourth switches Q3 and Q4 while synchronizing an on duration of one of the third and fourth switches Q3 and Q4 with an off duration of the other thereof in the respective switching cycles Ts In particular, the controller 100 is configured to turn on or off the second switch Q2 in a first duty factor D1, and turn on or off the fourth switch Q4 in a second duty factor D2. The first duty factor D1 can be expressed by "T1/Ts" where the on duration of the second switch Q2 for each switching cycle Ts is referred to as T1. Similarly, the second duty factor D2 can be expressed by "T2/Ts" where the on duration of the fourth switch Q4 for each switching cycle Ts is referred to as T2.

The first duty factor D1 and the second duty factor D2 of the first embodiment are set to be equal to each other. For this reason, each of the first and second duty factors D1 and D2 can also be referred to simply as a duty factor Duty.

The controller 100 sets, based on the first and second voltages Vdc1 and Vdc2, a value of the duty factor Duty to a value suitable for transmitting power from the low-voltage storage battery 20 to the medium-voltage storage battery 10. Specifically, the controller 100 divides the first voltage Vdc1 by the second voltage Vdc2 to thereby calculate a voltage boost ratio M, which is expressed by Vdc1/Vdc2, and sets the duty factor Duty to a value based on the voltage boost ratio M (see solid line in FIG. 4 as an example).

For example, if the voltage boost ratio M is calculated as 4, the controller 100 sets the duty factor Duty to 0.5, i.e. 50%. The controller 100 of the first embodiment is configured to set the duty factor duty to a value within the range from 0.5 inclusive to 1 exclusive.

The controller 100 is also configured to alternately turn on the set of fifth and eighth switches Q5 and Q8 and the set of sixth and seventh switches Q6 and Q7 in addition to control of the switching operations Q1 to Q4 to convert, i.e. rectify, the secondary voltage, which is an alternating-current (AC) voltage Vtra2 across the secondary coil 72, into a DC voltage. The DC voltage is smoothed by the second capacitor 42, so that the smoothed DC voltage is supplied to the high-voltage storage battery 30 via the first and second high-voltage terminals TH1 and TH2. This enables power to be transmitted between the medium-voltage storage battery 10 and the high-voltage storage battery 30. In particular, the controller 100 is configured to turn on or off each of the fifth to eighth switches Q5 to Q8 in the duty factor Duty.

Figure 2:
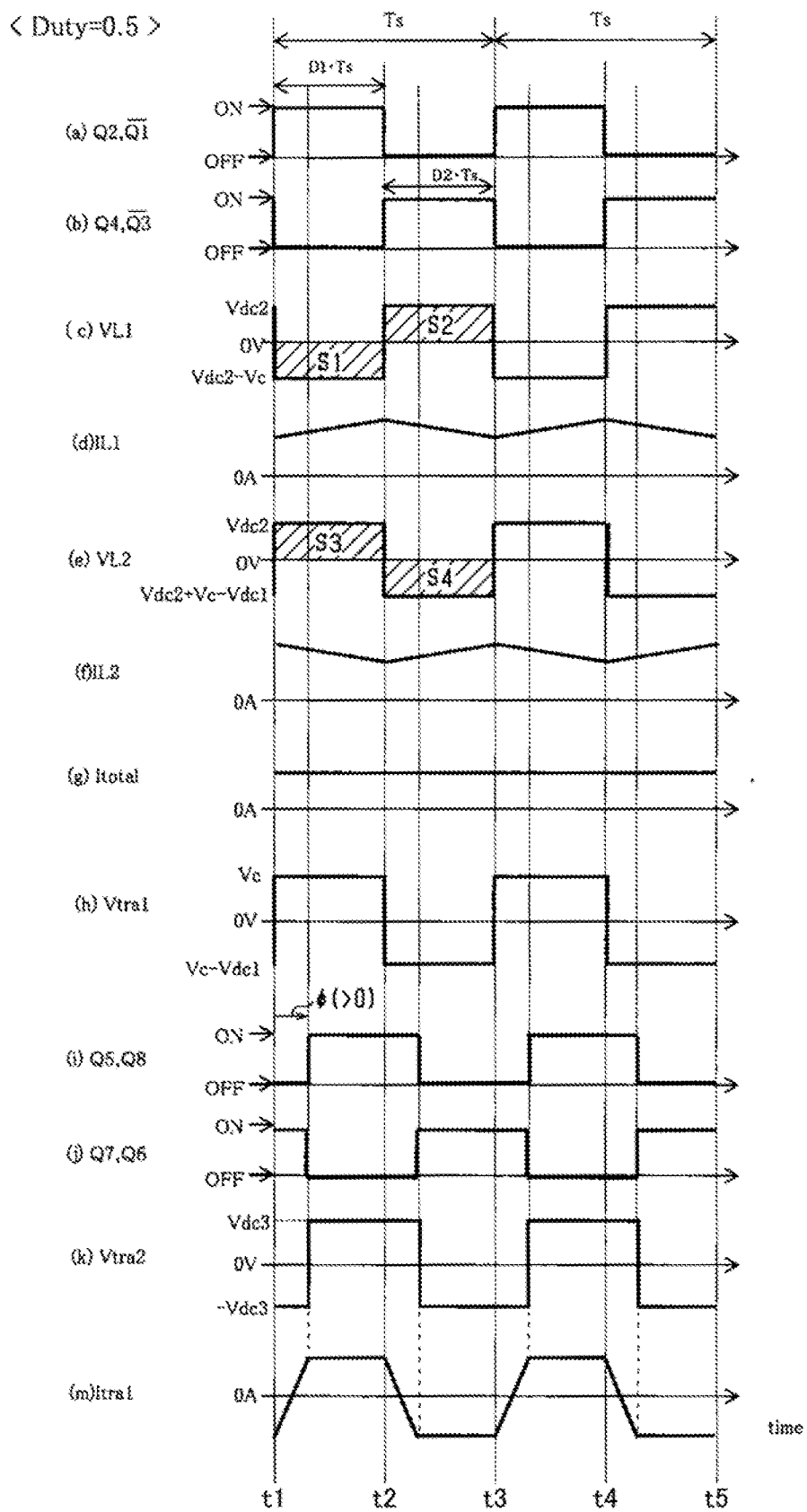
FIG. 2 is a timing chart schematically illustrating an example of how the power conversion apparatus operates upon a duty factor being set to 50%.
Figure 3:
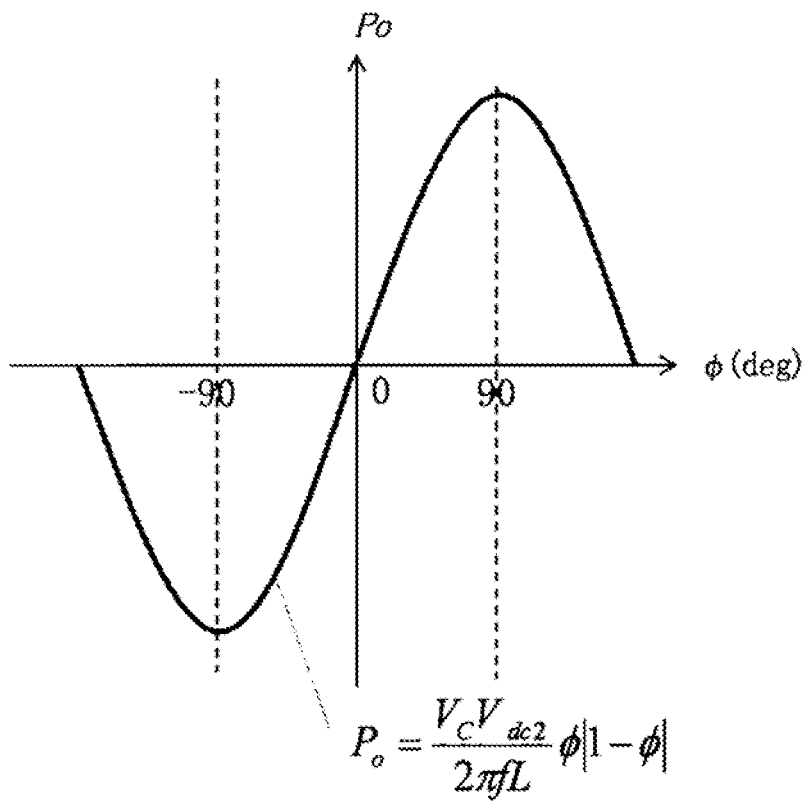
FIG. 3 is a graph schematically illustrating an example of a relationship between transmitted power and a phase difference.

FIG. 2 schematically illustrates an example of how the power conversion apparatus 40 operates upon the duty factor Duty being set to 50%.

As illustrated by each of reference characters (a) and (i) in FIG. 2, the phase difference ϕ between a switching timing from an off state to an on state of the second switch Q2 and a switching timing from the off state to the on state of each of the fifth and eighth switches Q5 and Q8 that is closest to the switching timing of the second switch Q2. The polarity of the phase difference ϕ is set to be positive if the switching timing from the off state to the on state of each of the fifth and eighth switches Q5 and Q8 appears to be later than the switching timing from the off state to on state of the second switch Q2.

In particular, the controller 100 is configured to adjust the phase difference ϕ to thereby adjust a value of power Po transmitted between the medium-voltage storage battery 10 and high-voltage storage battery 30.

For example, the controller 100 determines, based on the first and third voltages Vdc1 and Vdc3, a value of the phase difference ϕ required to set the transmitted power Po to target power. For example, the transmitted power Po and the phase difference ϕ have a relationship as a graph illustrated in FIG. 3, and the relationship satisfies the following equation (eq1):

$$Po = \frac{V_c V_{dc3}}{2\pi f L} \phi |1 - \phi| \quad \text{(eq1)}$$

where
1. Vc represents a terminal voltage across the decoupling capacitor 61
2. f represents a switching frequency, expressed by 2π/Ts, for each of the switches Q1 to Q8
3. L represents inductance associated with power transmission through the transformer 70, such as leakage inductance between the primary coil 71 and the secondary coil 72

Upon setting to the phase difference ϕ to a positive value, the controller 100 enables power to be transmitted from the medium-voltage storage battery 10 to the high-voltage storage battery 30. Upon setting to the phase difference ϕ to zero, the controller 100 enables power transmitted between the medium-voltage storage battery 10 and the high-voltage storage battery 30 to become zero.

For example, the controller 100 is configured to adjust the phase difference ϕ to be within the range from −90 degrees inclusive to +90 degrees inclusive. When setting the phase difference ϕ, the controller 100 calculates half of the first voltage Vdc1 as the terminal voltage Vc across the decoupling capacitor 61. The reason why the terminal voltage across the decoupling capacitor 61 can be expressed as "Vc=Vdc1/2" will be described later.

Next, the following describes how the power conversion apparatus 40 having the duty factor Duty of 0.5 (50%) works with reference to FIG. 2. Reference character (a) in FIG. 2 shows how the second and first switches Q2 and Q1 are switched, reference character (b) in FIG. 2 shows how the fourth and third switches Q4 and Q3 are switched, and reference character (c) in FIG. 2 represents how a terminal voltage VL1 across the first inductor 51 is changed over time.

Reference character (d) in FIG. 2 shows how a current, which will be referred to as a first inductor current, IL1 flowing through the first inductor 51 is changed over time, reference character (e) in FIG. 2 shows how a terminal voltage VL2 across the second inductor 52 is changed over time, and reference character (f) in FIG. 2 shows how a current IL2, which will be referred to as a second inductor current, flowing through the second inductor 52 is changed over time.

Reference character (g) in FIG. 2 shows how the sum of the first inductor current IL1 and the second inductor current IL2, which will be referred to as a total current Itotal, is changed over time, and reference character (h) in FIG. 2 shows the primary voltage Vtra1 across the primary coil 71 is changed over time.

Reference character (i) in FIG. 2 shows how the fifth and eighth switches Q5 and Q8 are switched, and reference character (j) in FIG. 2 shows how the seventh and fifth switches Q7 and Q5 are switched.

Reference character (k) in FIG. 2 shows how the secondary voltage Vtra2 across the secondary coil 72 is changed over time, and reference character (m) shows how a current Itra1 flowing through the primary coil 71 is changed over time.

Note that the on-off state of the first switch Q1 illustrated by reference character (a) in FIG. 2 corresponds to the reversed on-off state of the second switch Q2, and the on-off state of the third switch Q3 illustrated by reference character (b) in FIG. 2 corresponds to the reversed on-off state of the fourth switch Q4. For example, the on state of each of the second and fourth switches Q2 and Q4 corresponds to the off state of the corresponding one of the first and third switches Q1 and Q3. For this reason, reference character (a) in FIG. 2 shows how the on-off state of the second switch Q2 is changed using a symbol Q2, and also shows how the reversed on-off state of the second switch Q1 is changed using a symbol $\overline{Q1}$. Similarly, reference character (b) in FIG. 2 shows how the on-off state of the fourth switch Q4 is changed using a symbol Q4, and also shows how the reversed on-off state of the third switch Q3 is changed using a symbol $\overline{Q3}$.

The polarity of the terminal voltage VL1 across the first inductor 51 is positive when the potential at the second end of the first inductor 51 is higher than the first end of the first inductor 51, so that the polarity of the first inductor current IL1 flowing through the first inductor 51 is positive when the first inductor current IL1 flows from the second end of the first inductor 51 to the first end thereof. Similarly, the polarity of the terminal voltage VL2 across the second inductor 52 is positive when the potential at the second end of the second inductor 52 is higher than the first end of the second inductor 52, so that the polarity of the second inductor current IL2 flowing through the second inductor 52 is positive when the second inductor current IL2 flows from the second end of the second inductor 52 to the first end thereof.

The polarity of the primary voltage Vtra1 across the primary coil 71 is positive when the potential at the first end of the primary coil 71 is higher than the second end of the primary coil 71. Similarly, the polarity of the secondary voltage Vtra2 across the secondary coil 72 is positive when the potential at the first end of the secondary coil 72 is higher than the second end of the secondary coil 72. The primary current Itra1 flowing through the primary coil 71 is positive when the primary current Itra1 flows from the first end of the primary coil 72 to the second end thereof.

The controller 100 controls on-off switching operations of the switches Q1 to Q4 in a first switching mode to turn on the second switch Q2 and turn off the first switch Q1, and turn off the fourth switch Q4 and turn on the third switch Q3 at time t1, resulting in the terminal voltage VL1 being expressed as "VL1=Vdc2−Vc" and the terminal voltage VL2 being expressed as "VL2=Vdc2". After half of the switching cycle Ts has elapsed since the time t1, the controller 100 controls on-off switching operations of the switches Q1 to Q4 in a second switching mode to turn off the second switch Q2 and turn on the first switch Q1, and turn on the fourth switch Q4 and turn off the third switch Q3 at time t2, resulting in the terminal voltage VL1 being expressed as "VL1=Vdc2" and the terminal voltage VL2 being expressed as "VL2=Vdc2+Vc−Vdc1". That is, the controller 100 alternately controls on-off switching operations of the switches Q1 to Q4 in the first switching mode and the second switching mode every half of the switching cycle Ts (see time t3, t4, and t5).

While the power conversion apparatus 40 is in a steady state in which each of the first and second voltages Vdc1 and Vdc2 is kept unchanged, a volt-second product (EC product)

of the first voltage Vdc1 balances with the EC product of the second voltage Vdc2 during each switching cycle Ts balance with each other.

That is, a hatched area S1 defined by the product of the value (Vdc2−Vc) and half of the switching cycle Ts is identical to a hatched area S2 defined by the product of the second voltage Vdc2 and half of the switching cycle Ts (see reference character (c) of FIG. 2). Similarly, a hatched area S3 defined by the product of the second voltage Vdc2 and half of the switching cycle Ts is identical to a hatched area S4 defined by the product of the value (Vdc2+Vc−Vdc1) and half of the switching cycle Ts (see reference character (e) of FIG. 2).

From the relationship between the hatched areas S1 and S2 and the relationship between the hatched areas S3 and S4, the following equations (eq2) and (eq3) are derived:

$$Vdc2 \cdot Duty \cdot Ts + (Vdc2 - Vc)(1 - Duty)Ts = 0 \qquad (eq2)$$

$$Vdc2 \cdot Duty \cdot Ts + (Vdc2 + Vc - Vdc1)(1 - Duty)Ts = 0 \qquad (eq3)$$

From these equations (eq2) and (eq3), the following equations (eq4) to (eq7) are derived:

$$Vdc1 = \frac{2V_{dc2}}{1 - Duty} \qquad (eq4)$$

$$M = \frac{Vdc1}{Vdc2} = \frac{2}{1 - Duty} \qquad (eq5)$$

$$Duty = \frac{2Vdc2}{1 - Vdc1} \qquad (eq6)$$

$$Vc = \frac{V_{dc}}{2} \qquad (eq7)$$

Figure 4:
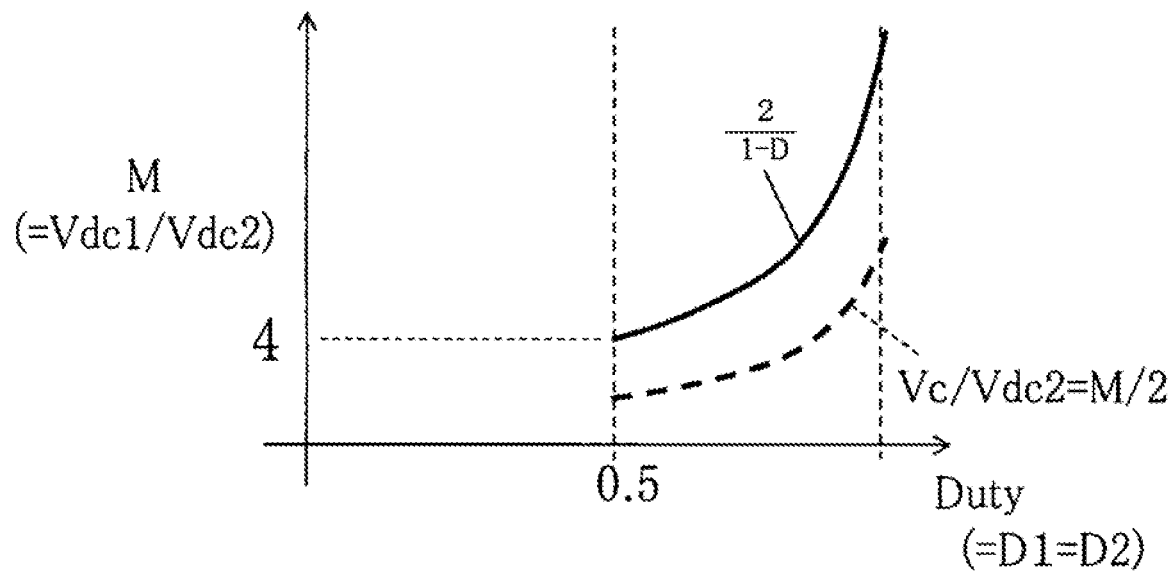
FIG. 4 is a graph schematically illustrating an example of a relationship between a voltage boost ratio of the power conversion apparatus and a duty factor for each switch of the power conversion apparatus

The above equation (eq5) shows the voltage boost ratio M upon power being transmitted from the low-voltage storage battery 20 to the medium-voltage storage battery 10. As illustrated in FIG. 4, a value of the voltage boost ratio M in accordance with the equation (eq5) (see solid line in FIG. 4) becomes twice the value of the voltage boost ratio M of a typical booster chopper circuit (see dashed line in FIG. 4). Assuming that the first voltage Vdc12 is set to 48 V and the second voltage Vdc2 is set to 12 V, the equation (eq6) enables the duty factor Duty to be set to 0.5, 50%. That is, the controller 100 of this assumption controls on-off switching operations of each of the switches Q1 to Q8 in accordance with the duty factor of 50%.

The above equation (eq7) shows that the terminal voltage across the decoupling capacitor 61 becomes half of the first voltage Vdc1 across the medium-voltage storage battery 10. This results in the positive voltage +Vc and the negative voltage −Vc being alternately applied across the primary voltage 71 (see reference character (h) of FIG. 2 and FIG. 6A).

That is, the power conversion apparatus 40 of the first embodiment is configured to alternately apply, across the primary voltage 71, the positive half and negative half of the terminal voltage Vdc1 across the medium-voltage storage battery 10. Setting the duty factor Duty to 50% under this configuration of the power conversion apparatus 40 enables the primary voltage Vtra1 to have an ideal rectangular waveform without including zero-voltage sections, resulting in the utilization factor of the transformer 70 becoming 100%. Note that the utilization factor of the transformer 70 for each switching cycle Ts according to the first embodiment represents the percentage of a period, in which the primary voltage Vtr1 applied across the primary coil 71 has non-zero values, during the corresponding switching cycle Ts.

In contrast, a comparative-example power conversion apparatus whose circuit configuration is disclosed in FIG. 1 of the published patent document No. 2015-100198 results in the duty ratio of the primary converter being 25% upon the terminal voltage (VA) across the first device being set to 48 V and the terminal voltage (VB) across the second device being set to 12 V, which is similar to the first embodiment.

This causes a primary voltage Vtra1a across the primary winding of the transformer of the comparative-example power conversion apparatus to have zero-voltage sections during each switching cycle Ts. This reduce the utilization factor of the transformer of the comparative-example power conversion apparatus (see FIG. 6B), resulting in a reduction in the power conversion efficiency between the medium-voltage storage battery and the high-voltage storage battery of the comparative-example power conversion apparatus.

Figure 7:
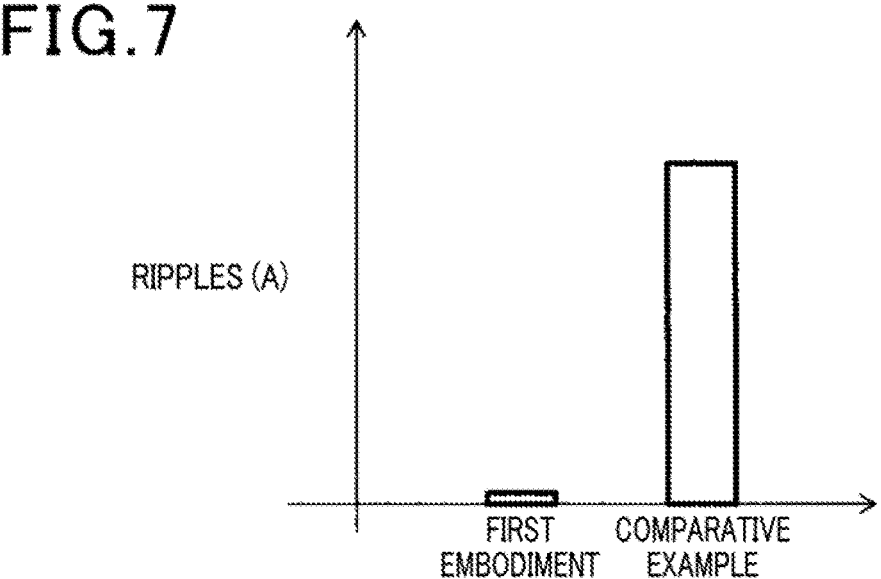
FIG. 7 is a graph schematically illustrating an amplitude of ripples contained in a total current according to the first embodiment, and an amplitude of ripples contained in a corresponding total current according to the comparative example.

Additionally, the first inductor current IL1 flowing through the first inductor 51 has a phase that is the inverse of the phase of the second inductor current IL2 flowing through the second inductor 52 so that the first and second inductor currents IL1 and IL2 have a phase difference of 180 electrical degrees therebetween (see reference characters (d) and (f) of FIG. 2). This enables the total current Itotal to have less ripples, ideally have no ripples. This results in, as illustrated in FIG. 7, the amplitude, such as the maximum amplitude and/or average amplitude, of the ripples contained in the total current Itotal according to the first embodiment being smaller than the amplitude, such as the maximum amplitude and/or average amplitude, of the ripples contained in the total current Itotal according to the comparative example. In particular, the first embodiment makes it possible to reduce the maximum amplitude and/or average amplitude of the ripples contained in the total current Itotal according to the first embodiment to be substantially one-tenth or less of the maximum amplitude and/or average amplitude of the ripples contained in the total current Itotal according to the comparative example.

Figure 5:
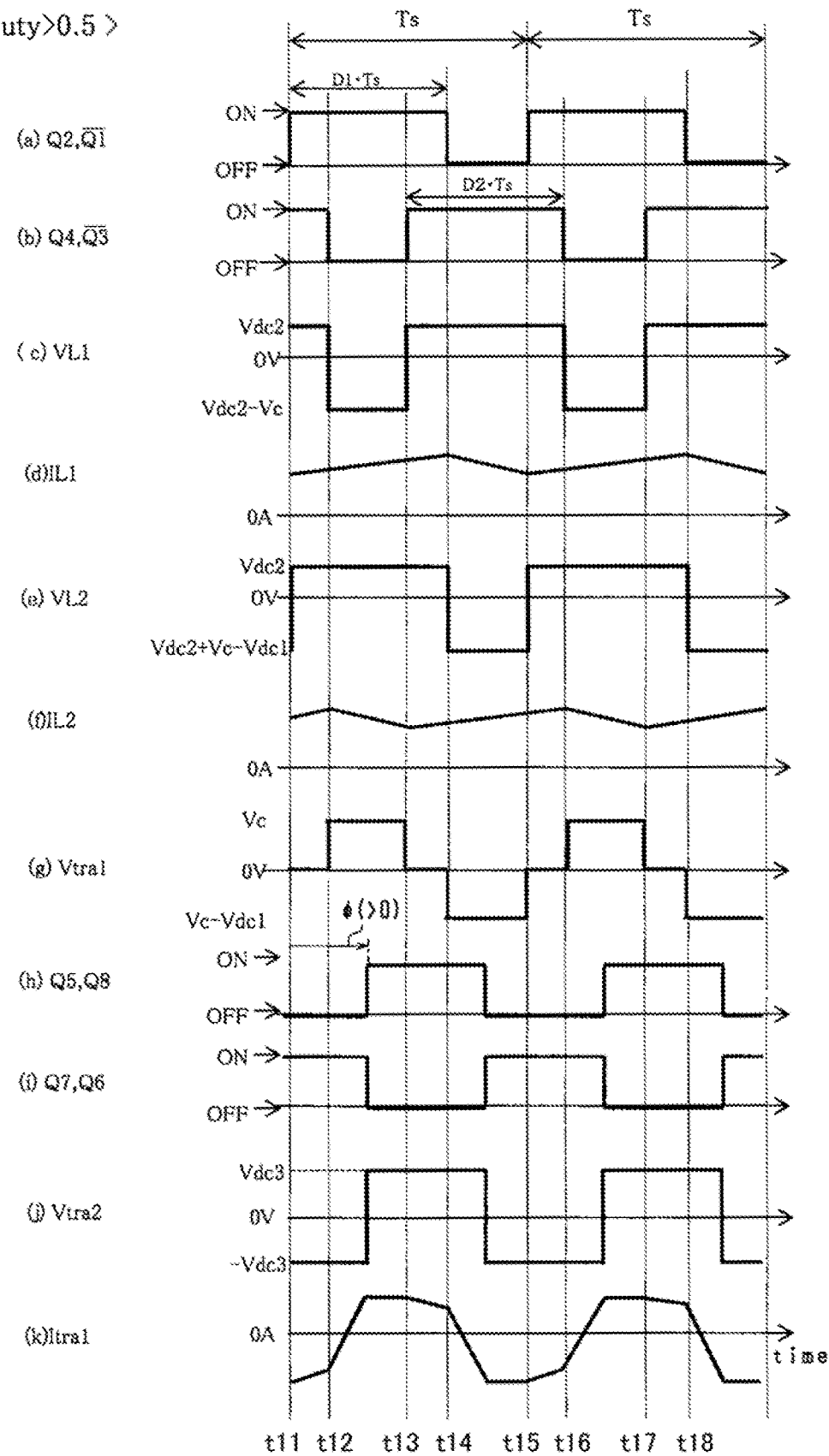
FIG. 5 is a timing chart schematically illustrating an example of how the power conversion apparatus operates upon the duty factor being set to a value higher than 50%.
Figure 6A:
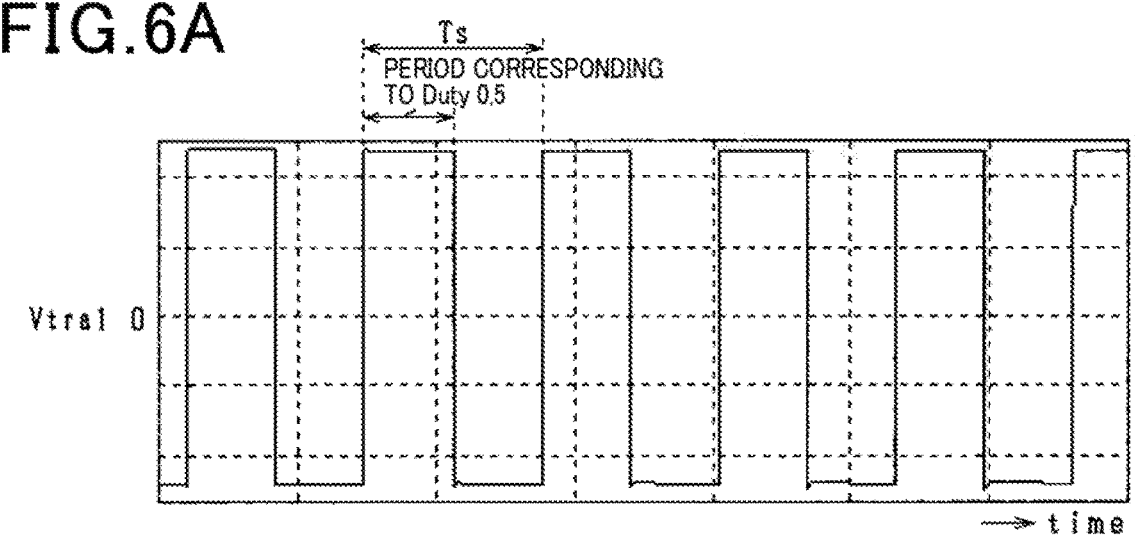
FIG. 6A is a graph schematically illustrating an example of how a primary voltage across a primary coil of a transformer of the power conversion apparatus is changed over time according to the first embodiment.
Figure 6B:
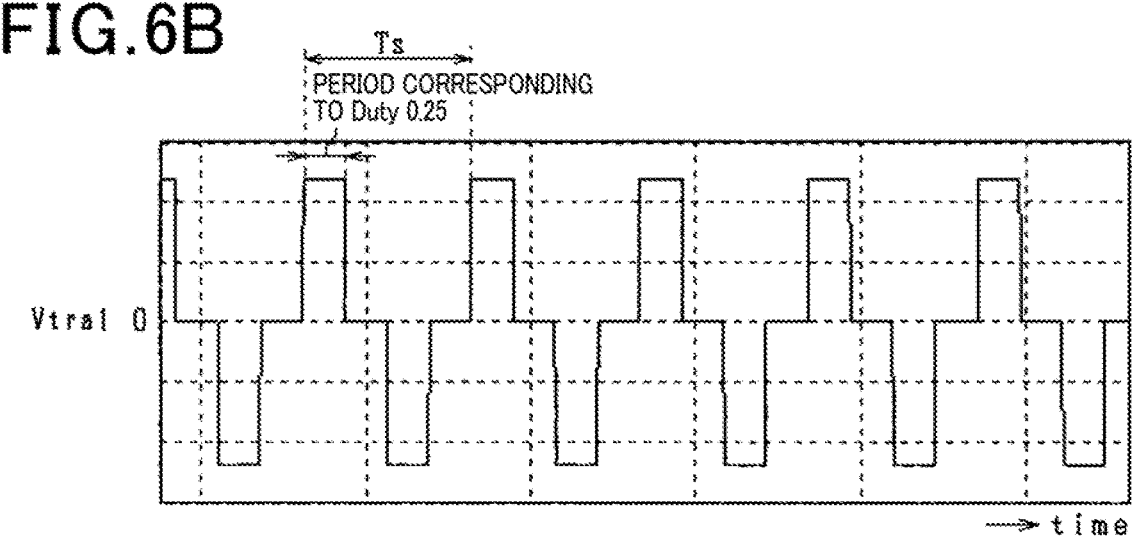
FIG. 6B is a graph schematically illustrating an example of how a primary voltage across a primary coil of a transformer of a power conversion apparatus is changed over time according to a comparative example.

Note that FIG. 5 schematically illustrates how the power conversion apparatus 40 having the duty factor Duty being set to be larger than 0.5 (50%) works.

Reference characters (a) to (f) of FIG. 5 respectively corresponds to the reference characters (a) to (f) of FIG. 2, and reference characters (g) to (k) of FIG. 5 respectively corresponds to the reference characters (h) to (m) of FIG. 2.

As illustrated by the reference characters (a) and (b) of FIG. 5, the controller 100 turns on the second switch Q2 and turn off the first switch Q1 every switching cycle Ts based on the duty factor Duty being set to be larger than 0.5 (see times t11, t14, t15, and t18). Similarly, the controller 100 turns off the fourth switch Q4 and turn on the third switch Q3 every switching cycle Ts based on the duty factor Duty being set to be larger than 0.5 (see times t12, t13, t16, and t17).

As seen by comparison between the waveform of the primary voltage Vtra1 in the first embodiment (see reference character (g) of FIG. 5) and the waveform of the primary voltage Vtra1a in the comparison example (see FIG. 6B), although the primary voltage Vtra1 in the first embodiment includes one zero-voltage section during each switching cycle Ts, the utilization factor of the transformer 70 becomes higher than the utilization factor of the transformer of the comparison example.

The power conversion apparatus 40 according to the first embodiment described in detail above obtains the following technical effects.

Specifically, the first converter 60 of the power conversion apparatus 40 is configured of the first to fourth switches Q1 to Q4, and the decoupling capacitor 61. This configuration enables the voltage boost ratio M of the power conversion apparatus 40 upon power being transmitted from the medium-voltage storage battery 10 to the low-voltage storage battery 20 to have a higher value even if there is a large difference between the first voltage Vdc1 across the medium-voltage storage battery 10 and the second voltage Vdc2 across the low-voltage storage battery 20. This therefore enables the duty factor Duty for each of the switches Q1 to Q4 to be set to a higher value.

Setting the duty factor Duty for each of the switches Q1 to Q4 to a higher value increases the utilization factor of the transformer 70, thus increasing the power conversion efficiency during power transmission between the medium-voltage storage battery 10 and the high-voltage storage battery 30.

The power conversion apparatus 40 according to the first embodiment is configured such that (1) The rated voltage of the medium-voltage storage battery 10 is set to be four times higher than the rated voltage of the low-voltage storage battery 20

(2) The controller 100 controls on-off switching operations of each of the first to fourth switches Q1 to Q4 using the duty factor Duty of 50%

This configuration enables the utilization factor of the transformer 70 to have 100% or a value close to 100%.

Setting the duty factor Duty to 50% results in a reduction in the amplitude of the ripples contained in the total current Itotal, which is the sum of the first inductor current IL1 and the second inductor current IL2, making it possible to reduce the inductance required for each of the first and second inductors 51 and 52. This enables each of the first and second inductors 51 and 52 having a smaller size to be used for the power conversion apparatus 40.

The power conversion apparatus 40 according to the first embodiment is configured such that the number of turns N1 of the primary coil 71 and the number of turns N2 of the secondary coil 72 are determined to satisfy the following equation:

$$N1:N2 = 0.5 \times V1:V3$$

where V1 represents the rated voltage V1 of the medium-voltage storage battery 10, and V2 represents the rated voltage of the high-voltage storage battery 30.

This configuration achieves higher power conversion efficiency upon power being transmitted between the medium-voltage storage battery 10 and the high-voltage storage battery 30.

Second Embodiment

Figure 8:
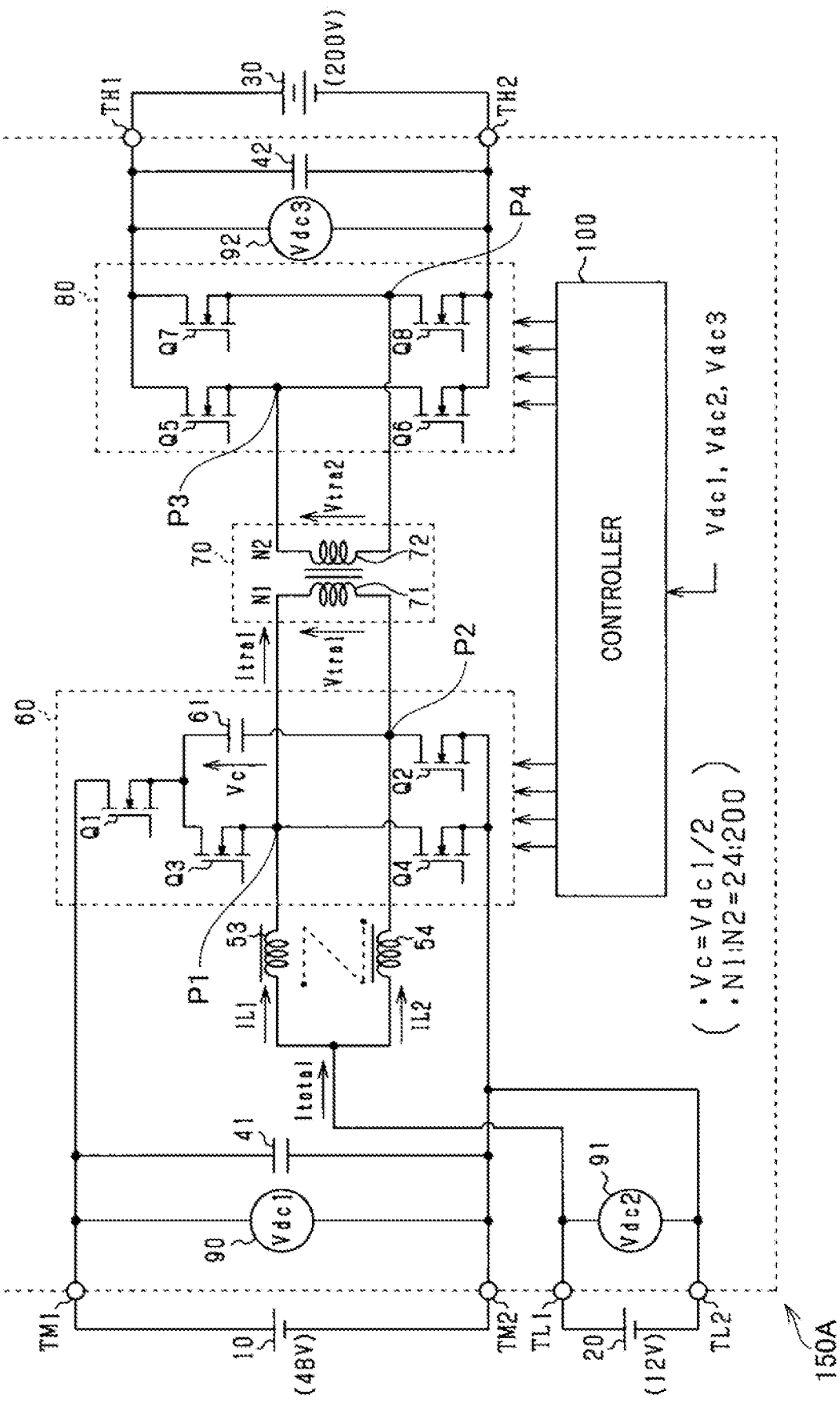
FIG. 8 is a circuit diagram schematically illustrating an example of the overall configuration of a power conversion apparatus according to the second embodiment of the present disclosure.

The following describes the second embodiment of the present disclosure with reference to FIG. 8. The configuration and functions of a power conversion apparatus 40A of a power conversion system 150A according to the second embodiment are mainly different from those of the power conversion apparatus 40 according to the first embodiment by the following points. The following therefore mainly describes the different points.

The power conversion apparatus 40A of the second embodiment is configured such that the first inductor 53 and the second inductor 54 are magnetically coupled to each other. The polarities of the first and second ends of the second inductor 54 are set to be respectively positive and negative upon the first inductor current IL1 flowing from the second end of the first inductor 53 to the first end thereof. The first and second inductors 53 and 54 can be integrated with each other.

Because the power conversion apparatus 40A of the second embodiment substantially has the same configuration as the configuration of the power conversion apparatus 40 of the first embodiment, the power conversion apparatus 40A of the second embodiment obtains the same technical effects as the technical effects obtained by the power conversion apparatus 40 of the first embodiment.

Third Embodiment

Figure 9:
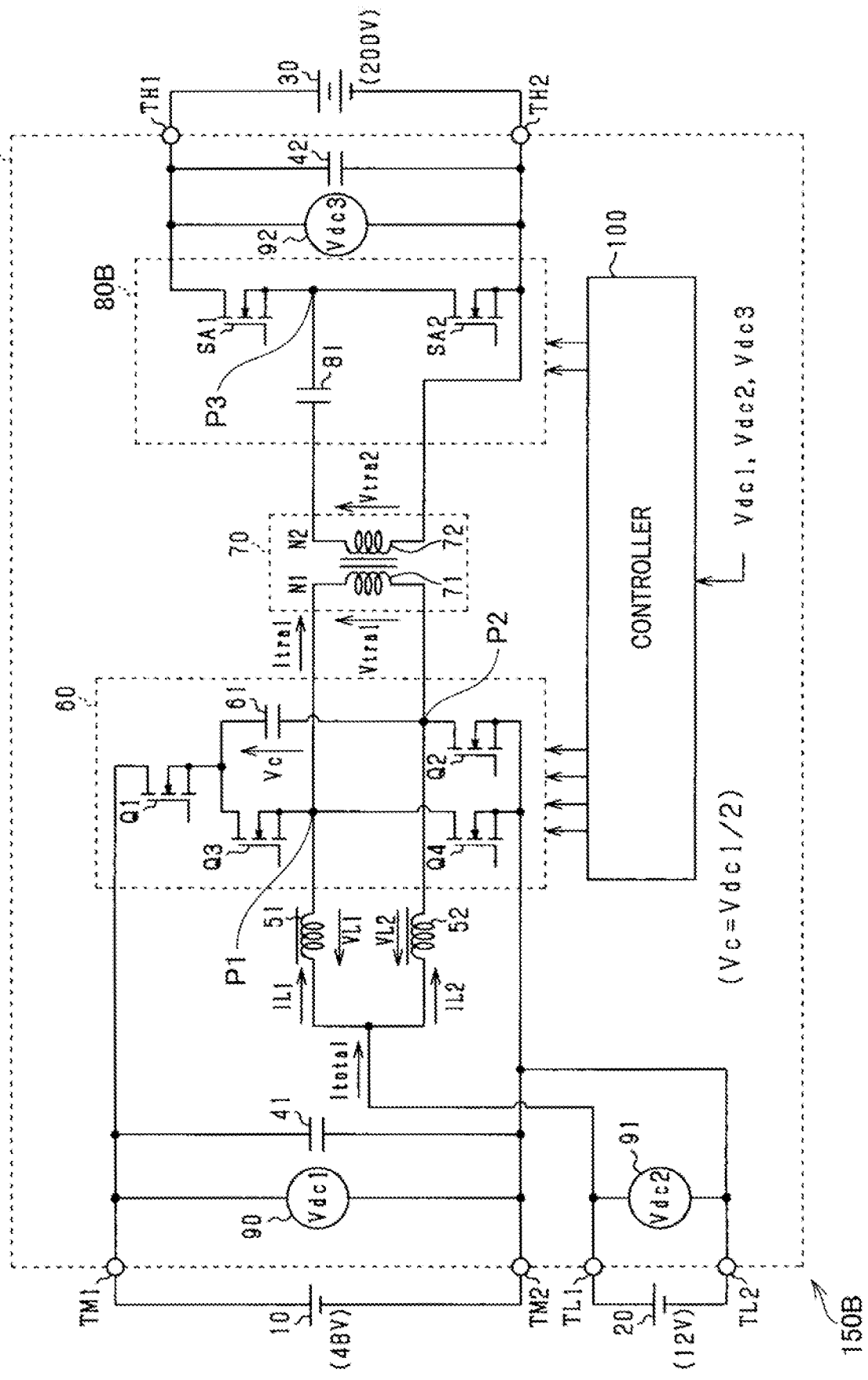
FIG. 9 is a circuit diagram schematically illustrating an example of the overall configuration of a power conversion apparatus according to the third embodiment of the present disclosure.

The following describes the third embodiment of the present disclosure with reference to FIG. 9. The configuration and functions of a power conversion apparatus 40B of a power conversion system 150B according to the third embodiment are mainly different from those of the power conversion apparatus 40 according to the first embodiment by the following points. The following therefore mainly describes the different points.

The power conversion apparatus 40B of the third embodiment is comprised of a second converter 80B in place of the second converter 80.

The second converter 80B is configured as a half-bridge converter comprised of first and second conversion switches SA1 and SA2 connected in half-bridge configuration. For example, the third embodiment uses N-channel MOSFETS as the respective first and second conversion switches SA1 and SA2.

The second converter 80B also includes a conversion capacitor 81 having opposing first and second ends, i.e. opposing first and second electrodes.

Each of the first and second conversion switches SA1 and SA2 has the drain as a first terminal, the source as a second terminal, and the gate as a control terminal.

The source of the first conversion switch SA1 is connected to the drain of the second conversion switch SA2 at a connection point P3. The first end of the secondary coil 72 is connected to the first end of the conversion capacitor 81, and the second end of the conversion capacitor 81 is connected to the connection point P3 between the source of the first conversion switch SA1 and the drain of the second conversion switch SA2. The drain of the first conversion switch SA1 is connected to the first high-voltage terminal TH1, and the source of the second conversion switch SA2 is connected to both the second end of the secondary coil 72 and the second high-voltage terminal TH2. The line connected to the negative terminal of the high-voltage storage battery 30 via the terminal TH2, and the source of the second conversion switch SA2 serves as the second common signal ground of the power conversion apparatus 40B.

The power conversion apparatus 40B is configured such that the secondary voltage Vtra2 is stored as charge in the conversion capacitor 81, and the voltage, i.e. the secondary voltage Vtra2 across the conversion capacitor 81 based on the charge stored in the conversion capacitor 81. The secondary voltage Vtra2 is rectified by the half-bridged switches SA1 and SA2 as described above.

The number of turns of the secondary coil 72 of the second embodiment is set to be half the number of turns of the secondary coil 72 of the first embodiment.

The controller 100 is configured to control on-off switching operations of the first conversion switch SA1 in the same manner as on-off switching operations of each of the fifth and eighth switches Q5 and Q8, and control on-off switching operations of the second conversion switch SA2 in the same manner as on-off switching operations of each of the sixth and seventh switches Q6 and Q7.

Because the power conversion apparatus 40B of the third embodiment substantially has the same configuration as the configuration of the power conversion apparatus 40 of the first embodiment, the power conversion apparatus 40B of the third embodiment obtains the same technical effects as the technical effects obtained by the power conversion apparatus 40 of the first embodiment.

Additionally, the power conversion apparatus 40B of the third embodiment obtains an additional technical effect of the second converter 80B having a smaller size as compared with the second converter 80.

Fourth Embodiment

Figure 10:
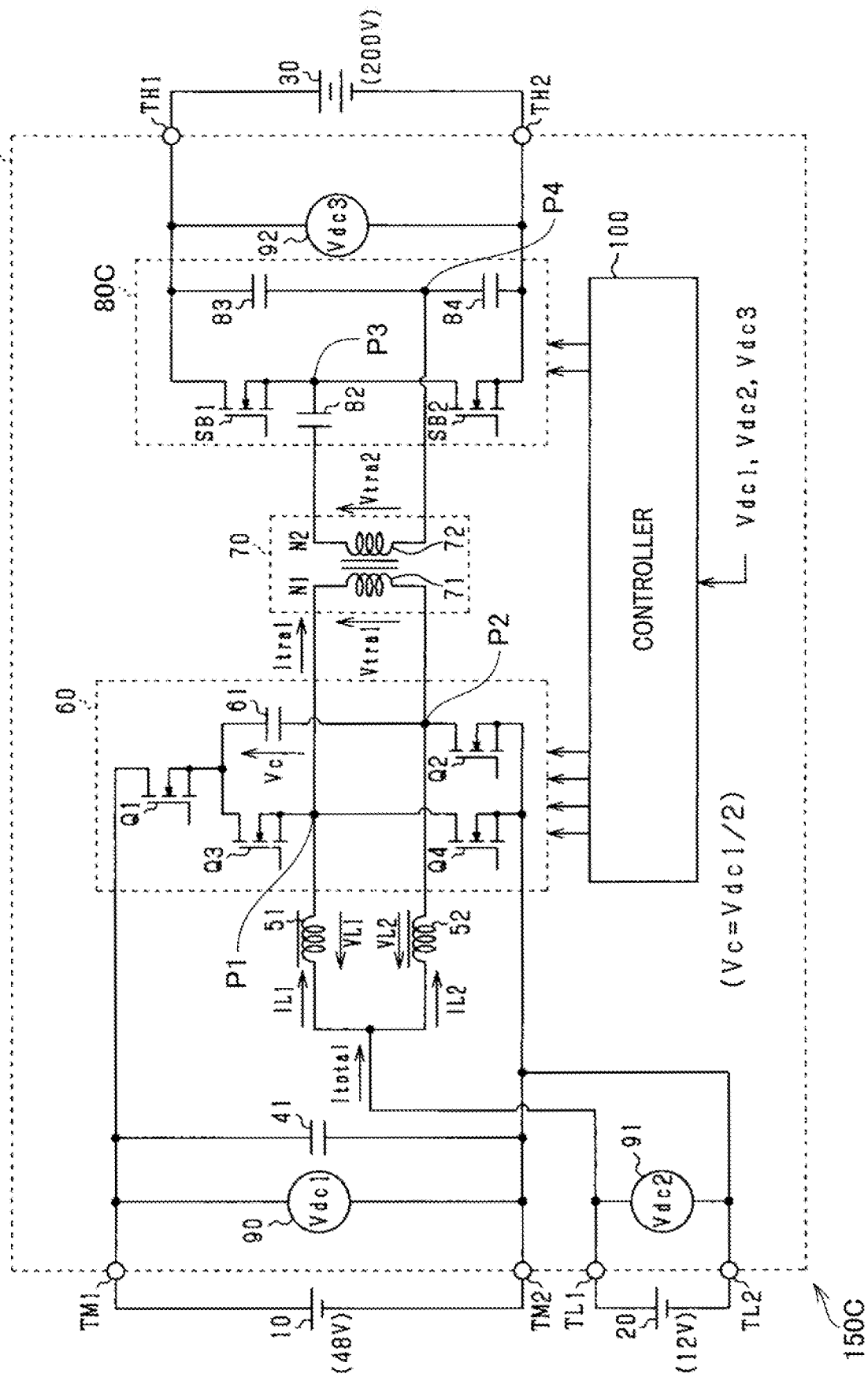
FIG. 10 is a circuit diagram schematically illustrating an example of the overall configuration of a power conversion apparatus according to the fourth embodiment of the present disclosure.

The following describes the fourth embodiment of the present disclosure with reference to FIG. 10. The configuration and functions of a power conversion apparatus 40C of a power conversion system 150C according to the fourth embodiment are mainly different from those of the power conversion apparatus 40 according to the first embodiment by the following points. The following therefore mainly describes the different points.

The power conversion apparatus 40C of the fourth embodiment is comprised of a second converter 80C in place of the second converter 80B.

The second converter 80C includes first and second conversion switches SB1 and SB2. For example, the third embodiment uses N-channel MOSFETS as the respective first and second conversion switches SB1 and SB2.

The second converter 80C also includes first to third conversion capacitors 82 to 84 each having opposing first and second ends, i.e. opposing first and second electrodes. Each of the first to fourth conversion switches SB1 to SB4 has the drain as a first terminal, the source as a second terminal, and the gate as a control terminal.

The source of the first conversion switch SB1 is connected to the drain of the second conversion switch SB2 at a connection point P3 so that the first and second conversion switches SB1 and SB2 are connected in series to each other to constitute a series switch circuit. The first end of the secondary coil 72 is connected to the first end of the first conversion capacitor 82, and the second end of the first conversion capacitor 81 is connected to the connection point P3 between the source of the first conversion switch SB1 and the drain of the second conversion switch SB2. The drain of the first conversion switch SB1 is connected to the first high-voltage terminal TH1, and the source of the second conversion switch SB2 is connected to the second high-voltage terminal TH2. The line connected to the negative terminal of the high-voltage storage battery 30 via the terminal TH2, and the source of the second conversion switch SA2 serves as the second common signal ground of the power conversion apparatus 40C.

The first end of the second conversion capacitor 83 is connected to the drain of the first conversion switch SB1, and to the first high-voltage terminal TH1. The second end of the second conversion capacitor 83 is connected to the first end of the third conversion capacitor 84 at a connection point P4, and the second end of the third conversion capacitor 84 is connected to the source of the second conversion switch SB2 and to the second high-voltage terminal TH2. This enables the second and third conversion capacitors 83 and 84 to be connected in series to each other, thus constituting a series capacitor circuit. The second end of the secondary coil 72 is connected to the connection point P4 between the second end of the second conversion capacitor 83 and the first end of the third conversion capacitor 84.

That is, the series capacitor circuit comprised of the second and third conversion capacitors 83 and 84 is connected in parallel to the series switch circuit comprised of the first and second conversion switches SB1 and SB2.

The number of turns of the secondary coil 72 of the second embodiment is set to be half the number of turns of the secondary coil 72 of the first embodiment.

The controller 100 is configured to control on-off switching operations of the first conversion switch SB1 in the same manner as on-off switching operations of each of the fifth and eighth switches Q5 and Q8, and control on-off switching operations of the second conversion switch SB2 in the same manner as on-off switching operations of each of the sixth and seventh switches Q6 and Q7. This enables the second converter 80C to rectify the secondary voltage Vtra2 across the first conversion capacitor 82 into a DC voltage.

Because the power conversion apparatus 40C of the fourth embodiment substantially has the same configuration as the configuration of the power conversion apparatus 40 of the first embodiment, the power conversion apparatus 40C of the fourth embodiment obtains the same technical effects as the technical effects obtained by the power conversion apparatus 40 of the first embodiment.

Additionally, the power conversion apparatus 40C of the fourth embodiment obtains an additional technical effect of reducing the number of switches as compared with the power conversion apparatus 40.

Fifth Embodiment

Figure 11:
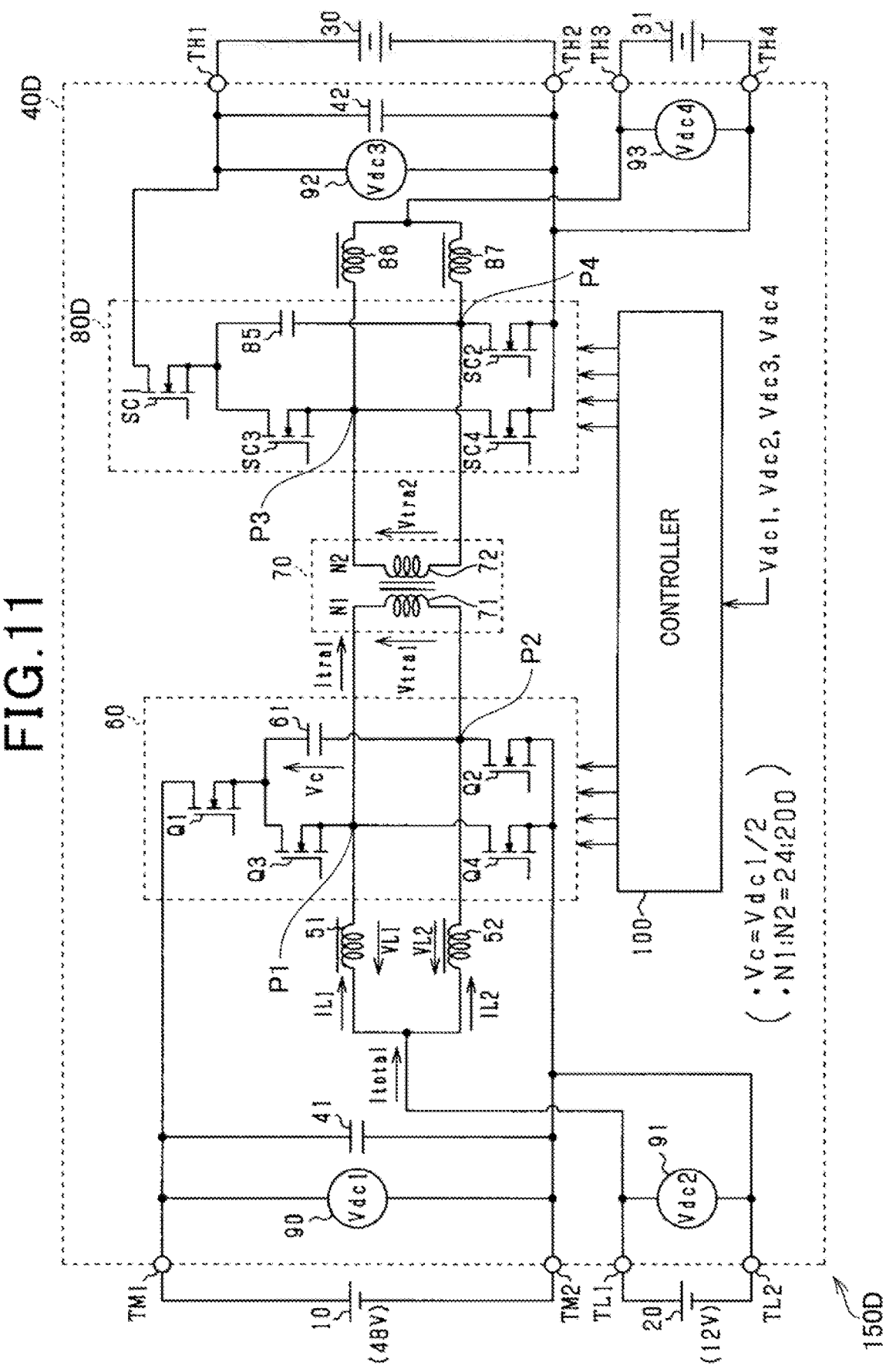
FIG. 11 is a circuit diagram schematically illustrating an example of the overall configuration of a power conversion apparatus according to the fifth embodiment of the present disclosure.

The following describes the fifth embodiment of the present disclosure with reference to FIG. 11. The configuration and functions of a power conversion apparatus 40D of a power conversion system 150D according to the fifth embodiment are mainly different from those of the power conversion apparatus 40 according to the first embodiment by the following points. The following therefore mainly describes the different points.

The power conversion system 150D includes the high-voltage battery 30 as a first high-voltage storage battery 30, and additionally includes a second high-voltage battery 31 serving as, for example, a fourth device.

The second high-voltage storage battery 31 has a terminal voltage thereacross. The terminal voltage, such as a rated voltage, across the second high-voltage storage battery 31 is set to be higher than the terminal voltage across the medium-voltage storage battery 10.

The power conversion apparatus 40D is capable of transmitting power among the medium-voltage storage battery 10, low-voltage storage battery 20, first high-voltage storage battery 30, and second high-voltage storage battery 32.

The power conversion apparatus 40D includes third and fourth high-voltage terminals (I/O ports) TH3 and TH4.

The power conversion apparatus 40D also includes a second converter 80D, a third inductor 81, and a fourth inductor 82.

The second converter 80D is configured of first to fourth conversion switches SC1 to SC4, and a conversion capacitor 85.

For example, the fifth embodiment uses N-channel MOSFETS as the respective first to fourth conversion switches SC1 to SC4.

Each of the first to fourth conversion switches SC1 to SC4 has the drain as a first terminal, the source as a second terminal, and the gate as a control terminal. The conversion capacitor 85 has opposing first and second ends, i.e. opposing first and second electrodes. The second high-voltage battery 31 has opposing positive and negative terminals.

The first high-voltage terminal TH1 is connected to the drain of the first conversion switch SC1, and the source of the first conversion switch SC1 is connected to both the first end of the conversion capacitor 85 and the drain of the third conversion switch SC3.

The source of the second conversion switch SC2 is connected to both the second high-voltage terminal TH2 and fourth high-voltage terminal TH4. The source of the third conversion switch SC3 is connected to the drain of the fourth conversion switch SC4 at a connection point P3, and the source of the fourth conversion switch SC4 is connected to both the second high-voltage terminal TH2 and fourth high-voltage terminal TH4. The second end of the conversion capacitor 85 is connected to the drain of the second conversion switch SC2 at a connection point P4.

Both the first end of the secondary coil 72 and the first end of the third inductor 86 are connected to the connection point P3 between the source of the third conversion switch SC3 and the drain of the fourth conversion switch SC4. Both the second end of the secondary coil 72 and the first end of the fourth inductor 87 are connected to the connection point P4 between the second end of the conversion capacitor 85 and the drain of the second conversion switch SC2.

The second end of each of the third and fourth inductors 86 and 87 is connected to the third high-voltage terminal TH3. The third high-voltage terminal TH3 is connected to the positive terminal of the second high-voltage storage battery 31, and the negative terminal of the second high-voltage storage battery 31 is connected to the fourth high-voltage terminal TH4. A single common terminal can be provided to the power conversion apparatus 40D to be shared as the second high-voltage terminal TH2 and the fourth high-voltage terminal TH4.

The power conversion system 150D also includes the high-voltage sensor 92 as a first high-voltage sensor 92, and additionally includes a second high-voltage sensor 93.

The second high-voltage sensor 93 is connected across the second high-voltage storage battery 31, and configured to measure the terminal voltage across the second high-voltage storage battery 31 as a fourth voltage Vdc4; the terminal voltage across the second high-voltage storage battery 31 represents a potential difference between the third high-voltage terminal TH3 and the fourth high-voltage terminal TH4.

The measurement value, i.e. the fourth voltage, Vdc4 measured by the sensor 93 is input to the controller 100 of the power conversion apparatus 40D.

The controller 100 receives the measurement values, i.e. the first to fourth voltages, Vdc1 to Vdc4, and controls on-off switching operations of each of the first to fourth switches Q1 to Q4 and first to fourth conversion switches SC1 to SC4 in accordance with the measurement values Vdc1 to Vdc4.

The controller 100 is configured to control on-off switching operations of each of the second and third conversion switches SC2 and SC3 in the same manner as on-off switching operations of the corresponding one of the eighth and fifth switches Q8 and Q5, and control on-off switching operations of each of the first and fourth conversion switches SC1 and SC4 in the same manner as on-off switching operations of the corresponding one of the seventh and sixth switches Q7 and Q6.

In particular, the controller 100 is configured to adjust a phase difference $\phi 1$ to thereby adjust a value of power transmitted between the medium-voltage storage battery 10 and second high-voltage storage battery 31; the phase difference $\phi 1$ between a switching timing from the off state to the on state of the second switch Q2 and a switching timing from the off state to the on state of each of the third and second conversion switches SC3 and SC4 that is closest to the switching timing of the second switch Q2.

For example, the controller 100 determines, based on the first and fourth voltages Vdc1 and Vdc4, a value of the phase difference $\phi 1$ required to set the transmitted power to target power in the same manner as determining the value of the phase difference $\phi$.

Because the power conversion apparatus 40D of the fifth embodiment substantially has the same configuration as the configuration of the power conversion apparatus 40 of the first embodiment, the power conversion apparatus 40D of the fifth embodiment obtains the same technical effects as the technical effects obtained by the power conversion apparatus 40 of the first embodiment.

Sixth Embodiment

Figure 12:
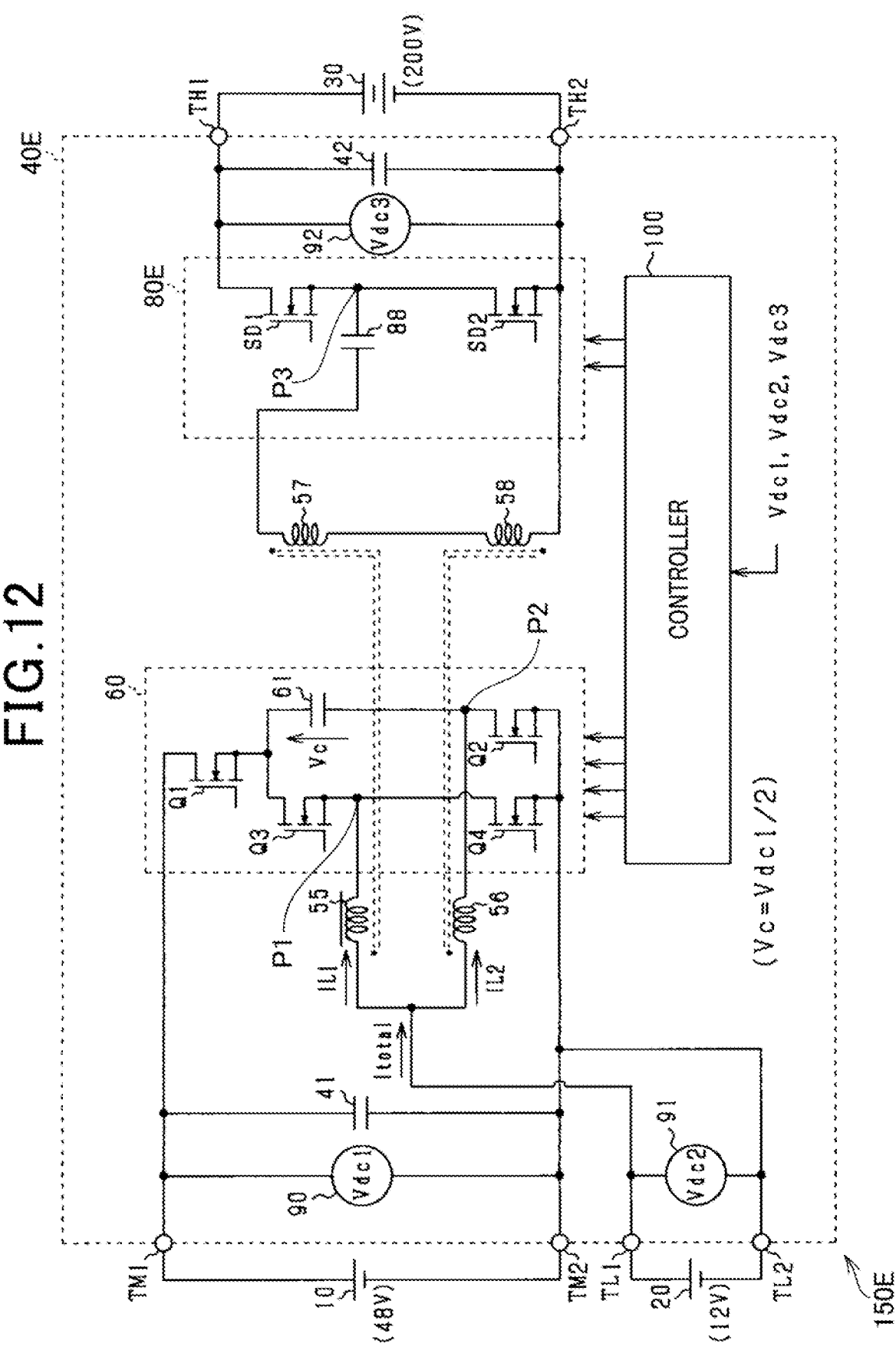
FIG. 12 is a circuit diagram schematically illustrating an example of the overall configuration of a power conversion apparatus according to the sixth embodiment of the present disclosure.

The following describes the sixth embodiment of the present disclosure with reference to FIG. 12. The configuration and functions of a power conversion apparatus 40E of a power conversion system 150E according to the sixth embodiment are mainly different from those of the power conversion apparatus 40 according to the first embodiment by the following points. The following therefore mainly describes the different points.

The power conversion system 150E includes first and second primary coils 55 and 56 in place of the respective first and second inductors 51 and 52. Each of the first and second primary coils 55 and 56 has opposing first and second ends.

The first end of the first primary coil 55 is connected to the connection point P1 between the source of the third switch Q3 and the drain of the fourth switch Q4. The first end of the second primary coil 56 is connected to the connection point P2 between the second end of the decoupling capacitor 61 and the drain of the second switch Q2. The first low-voltage terminal TL1 is connected to both the second ends of the respective first and second primary coils 55 and 56.

The power conversion system 150E also includes first and second secondary coils 57 and 58 in place of the transformer 70. Each of the first and second secondary coils 57 and 58 has opposing first and second ends. The set of the first and second secondary coils 57 and 58 serves as, for example, a magnetic circuit.

The power conversion apparatus 40E of the sixth embodiment is comprised of a second converter 80E in place of the second converter 80.

The second converter 80E is configured as a half-bridge converter comprised of first and second conversion switches SD1 and SD2 connected in half-bridge configuration. For example, the sixth embodiment uses N-channel MOSFETS as the respective first and second conversion switches SD1 and SD2.

The second converter 80E also includes a conversion capacitor 88 having opposing first and second ends, i.e. opposing first and second electrodes.

Each of the first and second conversion switches SD1 and SD2 has the drain as a first terminal, the source as a second terminal, and the gate as a control terminal.

The source of the first conversion switch SD1 is connected to the drain of the second conversion switch SD2 at a connection point P3. The first end of the first secondary coil 57 is connected to the first end of the conversion capacitor 88, and the second end of the conversion capacitor 88 is connected to the connection point P3 between the source of the first conversion switch SD1 and the drain of the second conversion switch SD2. The drain of the first conversion switch SD1 is connected to the first high-voltage terminal TH1, and the source of the second conversion switch SD2 is connected to both the second end of the second secondary coil 58 and the second high-voltage terminal TH2. The line connected to the negative terminal of the high-voltage storage battery 30 via the terminal TH2, and the source of the second conversion switch SD2 serves as the second common signal ground of the power conversion apparatus 40E.

The second end of the first secondary coil 57 and the first end of the second secondary coil 58 are connected in series to each other.

The first primary coil 55 and the first secondary coil 57 are magnetically coupled to each other, and the second primary coil 56 and the second secondary coil 58 are magnetically coupled to each other.

The polarities of the first and second ends of the first secondary coil 57 are relatively positive and negative upon a current flowing from the second end of the first primary coil 55 to the first end thereof. Similarly, the polarities of the first and second ends of the second secondary coil 58 are relatively negative and positive upon a current flowing from the second end of the second primary coil 56 to the first end thereof. The primary coils 55 and 56 can be integrated with each other, and the secondary coils 57 and 58 can be integrated with each other.

The controller 100 of the sixth embodiment is configured to control on-off switching operations of the first conversion switch SD1 in the same manner as on-off switching operations of each of the fifth and eighth switches Q5 and Q8, and control on-off switching operations of the second conversion switch SD2 in the same manner as on-off switching operations of each of the sixth and seventh switches Q6 and Q7.

Because the power conversion apparatus 40E of the sixth embodiment substantially has the same configuration as the configuration of the power conversion apparatus 40 of the first embodiment, the power conversion apparatus 40E of the sixth embodiment obtains the same technical effects as the technical effects obtained by the power conversion apparatus 40 of the first embodiment.

Additionally, the power conversion apparatus 40E of the sixth embodiment is configured such that the first pair of the first primary coil 55 and the first secondary coil 57 and the second pair of the second primary coil 56 and the second secondary coil 58 serve as both the first and second inductors 51 and 52 and the transformer 70. In other words, the power conversion apparatus 40E of the sixth embodiment is configured such that the first primary coil 55 serves as both the first inductor 51 and the primary coil 71 of the transformer 70, and the second primary coil 56 serves as both the second inductor 52 and the primary coil 71 of the transformer 70.

This configuration therefore makes it possible to reduce the number of elements constituting the power conversion apparatus 40E to be smaller.

Each of the above first to sixth embodiments can be variably modified.

For example, each of the first to fourth devices according to each of the first to fourth embodiments is not limited to a storage battery, so that other similar devices, such as high-capacity capacitors, can be used as the respective first to fourth devices.

Any electrical device, i.e. electrical load, such as an air-conditioning device, an electrical power-steering apparatus, or an integrated starter motor (ISG), can be connected to each of the pair of first and second medium-voltage terminals TM1 and TM2, and the pair of first and second high-voltage terminals TH1 and TH2

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A power conversion apparatus for power conversion among at least a first device, a second device, and a third device, a first terminal voltage across the first device being set to be higher than a second terminal voltage across the second device and lower than a third terminal voltage across the third device, the power converter comprising:
    a primary converter configured to perform power conversion between the first device and second device, the primary converter comprising a first switch, a second switch, a third switch, a fourth switch, and a capacitor, the second switch, the third switch, the fourth switch, and the capacitor being connected in full bridge configuration to constitute a full bridge converter having a first connection point between the third and fourth switches and a second connection point between the capacitor and the second switch, the first switch being connected in series between the full bridge converter and the first device;
    a secondary converter including at least one conversion switch connected to the third device;
    a magnetic circuit configured to magnetically connect between the primary converter and the secondary converter while electrically isolating between the primary converter and the secondary converter, the secondary converter being configured to perform power conversion of power transmitted between the transformer and the third device;
    a first inductor connected between the first connection point of the full bridge converter and the second device;
    a second inductor connected between the second connection point of the full bridge converter and the second device; and
    a controller configured to:
        control on-off switching operations of the at least one conversion switch;
        alternately turn on the first and second switches; and
        alternately turn on the third and fourth switches.

2. The power conversion apparatus according to claim 1, wherein:
    the magnetic circuit comprises a transformer comprising:
        a primary coil having opposing first and second ends; and
        a secondary coil magnetically coupled to the primary coil while electrically isolated from the primary coil, the first end of the primary coil being connected to the first connection point, the second end of the primary coil being connected to the second connection point.

3. The power conversion apparatus according to claim 1, wherein:
the first inductor is a first primary coil;
the second inductor is a second primary coil;
the magnetic circuit comprises:
a first secondary coil having opposing first and second ends and magnetically coupled to the first primary coil, the first end of the first secondary coil being connected to the second converter;
a second secondary coil having opposing first and second ends, the first end of the second secondary coil being connected in series to the second end of the first secondary coil.

4. The power conversion apparatus according to claim 2, wherein: the primary coil has a predetermined first number of turns; the secondary coil has a predetermined second number of turns; and the following equation is satisfied among the first terminal voltage across the first device, the third terminal voltage across the third device, the first number of turns of the primary coil, and the second number of turns of the secondary coil: where: N1 represents the first number of turns of the primary coil; N2 represents the second number of turns of the secondary coil; V1 represents the first terminal voltage across the first device; and V3 represents the third terminal voltage across the third device.

5. The power conversion apparatus according to claim 1, wherein: the controller is configured to control on-oft switching operations of each of the first switch, the second switch, the third switch, and the fourth switch using a duty factor set for a corresponding one of the first to fourth switches; the duty factor being expressed by the following equation:

$$\text{Duty} = \frac{2V2}{1-V1}$$

where: Duty represents the duty factor set for each of the first to fourth switches; V1 represents the first terminal voltage across the first device; and V2 represents the second terminal voltage across the second device.

6. The power conversion apparatus according to claim 1, wherein:
the first terminal voltage across the first device is four times higher than the second terminal voltage across the second device; and
the controller is configured to control on-off switching operations of each of the first switch, the second switch, the third switch, and the fourth switch using a duty factor of 50%.

7. The power conversion apparatus according to claim 1, wherein:
the controller is configured to adjust a difference between:
a first switching timing from an off state of the second switch to an on state thereof; and
a second switching timing from an off state of the conversion switch to an on state thereof.

8. The power conversion apparatus according to claim 1, wherein:
the controller is configured to adjust a duty factor of each of the first switch, the second switch, the third switch, and the fourth switch to thereby adjust power transmitted between the first device and the third device.

* * * * *